(12) United States Patent
Renfroe et al.

(10) Patent No.: US 7,073,822 B1
(45) Date of Patent: Jul. 11, 2006

(54) FLEXIBLE CABLE LEVER ARM STEERING SYSTEM APPARATUS AND METHOD

(76) Inventors: David A. Renfroe, 2368 Victoria, Fayetteville, AR (US) 72701; Joe Partain, 1362 Fieldstone, Fayetteville, AR (US) 72704

( * ) Notice: Subject to any disclaimer, the term of this patent is extended or adjusted under 35 U.S.C. 154(b) by 269 days.

(21) Appl. No.: 10/454,034

(22) Filed: Jun. 3, 2003

Related U.S. Application Data

(60) Provisional application No. 60/453,070, filed on Mar. 6, 2003.

(51) Int. Cl.
*B62D 1/00* (2006.01)
(52) U.S. Cl. ............... 280/771; 280/93.51; 280/93.502
(58) Field of Classification Search ................ 280/771, 280/93.51, 93.502
See application file for complete search history.

(56) References Cited

U.S. PATENT DOCUMENTS

| | | | |
|---|---|---|---|
| 2,757,014 A | 7/1956 | Schmitz | 280/87 |
| 4,006,664 A | 2/1977 | Brown | 91/171 |
| 4,986,387 A | 1/1991 | Thompson et al. | 180/212 |
| 5,090,512 A | 2/1992 | Mullet et al. | 180/236 |
| 5,094,312 A | 3/1992 | Hakel | 180/132 |
| 5,435,407 A | 7/1995 | Renfroe | 180/79 |
| 5,653,304 A | 8/1997 | Renfroe | 180/402 |
| 5,893,426 A | 4/1999 | Shimizu et al. | 180/400 |
| 5,931,244 A | 8/1999 | Renfroe et al. | 180/6.32 |

*Primary Examiner*—Eric Culbreth
(74) *Attorney, Agent, or Firm*—Keisling Pieper & Scott PLC; David B. Pieper; Treut C. Keisling

(57) ABSTRACT

A steering suspension system utilizing a flexible push/pull cable attached from an operator input mechanism across a suspension system to a wheel steering mechanism. An operator input mechanism is located within a land vehicle structure supported by a wheel. A suspension system connects the wheel to the land vehicle structure and a wheel steering mechanism is used to connect the wheel to the suspension system. The flexible cable connection minimizes the complexity in number of parts for the steering system while providing a flexible connection to the wheel steering mechanism allowing free suspension movement with minimal or negligible affects provided from the steering linkage.

9 Claims, 4 Drawing Sheets

FLEXIBLE CABLE LEVER ARM STEERING SYSTEM APPARATUS AND METHOD

CROSS-REFERENCE TO RELATED APPLICATIONS

This application claims priority to and is a continuation-in-part of U.S. provisional application Ser. No. 60/453,070, filed Mar. 6, 2003.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

Field of the Invention

The present invention relates to steering systems for wheeled vehicles. More particularly, the present invention relates to road or all terrain vehicles with at least two steerable wheels controlled by movement of a flexible cable. In the preferred embodiment, the steerable wheels are independently suspended from the vehicle frame and are under manual control of a driver using lever steering to control the movement of the other end of the flexible cable.

The structure, adjustment, and alignment of the steering mechanism of a wheeled vehicle is a somewhat complicated matter involving various relationships of each steerable wheel axle to the vehicle body referred to as caster, camber, toe-in, Ackerman angle and the like. No attempt is made here to present a detailed discussion of all these factors, except as they relate to the improvements of the present invention.

For over a century, the steering system for automotive vehicles has utilized a front axle which does not rotate about a vertical axis when the vehicle is steered to the right or the left. Rather, each front wheel is provided with a stub axle which is rotatable about a vertically disposed king-pin or equivalent pivotal mounting structure. Accordingly, it is necessary to provide means by which the front wheels turn to the left or turn to the right together in a coordinated fashion. It was long ago determined that optimum steering was not achieved with strictly parallel motion of the front wheels because the outwardly turning wheel is closer to the vehicle turning center than the inwardly turning wheel and needs to rotate through a greater angle. This refinement and provision for steering control is referred to as the Ackerman angle provision.

A common and conventional wheeled vehicle steering system provides for the rotation of the steering column or steering shaft to be converted into linear motion of a link which imparts a rotating motion to the stub axle of a wheel through a steering control arm extending from the stub axle. The common means for providing coordinated motion of the two steerable wheels includes a track arm which is fixed with respect to the stub axle on each wheel together with a track rod extending between the two track arms so that the two front wheels are constrained to move (track) in a predetermined relationship either to the right or to the left. In most cases, the linkage provided does not maintain the wheels parallel but rather provides respective non-linear turning relationships which take into account the Ackerman angle provision. As mentioned above, the present invention eliminates reliance upon a track rod or other direct mechanical linkage between the left and right steerable wheels by causing the turning motion of each wheel to be effected by its own independent (left or right) steering motion controller link.

Steering systems for wheeled vehicles have been proposed in prior patents which employ independent right and left steering motion controllers, in the form of hydraulic cylinders, for example, but such known steering systems have commonly provided direct wheel coordination with track rods or equivalent means between the left side and the right side wheel.

U.S. Pat. No. 5,094,312 to Hakel dated Mar. 10, 1992 shows a vehicle steering system in which the left and right steering control arms for the front wheels are both operated by a single double-acting hydraulic piston with oppositely directed piston rods each coupled by a mechanical link to a respective steering control arm. This single piston arrangement is in effect a direct mechanical linkage from the left side wheel to the right side wheel (there are not two independent hydraulic cylinders for the respective left and right steerable wheels).

U.S. Pat. No. 4,986,387 to Thompson, et al., dated Jan. 2, 1991 shows a steerable wheeled vehicle with a steerable wheel for which turning motion is provided by hydraulic cylinder and a rack and pinion, but, since there is only one steerable wheel, it provides no teaching with respect to coordination of two steerable wheels relevant to the present invention.

U.S. Pat. No. 5,090,512 to Mullet, et al., dated Feb. 25, 1992 relies on a mechanical connection from a left side cable unit to a right side cable unit of the steering system to produce the non-linear relation for wheel steering; wheel steering angle is directly proportional to cable motion at each wheel.

U.S. Pat. No. 4,006,664 to Brown dated Feb. 8, 1977 has hydraulic operated steering, but like the patent to Hakel has only a single cylinder for left and right wheels, the coordinated motion of which must be provided by a linkage directly connecting left and right wheels with the single cylinder provided for their operation. A cable-type steering device is shown in U.S. Pat. No. 5,893,426 to Shimizu, et al., dated Apr. 13, 1999 wherein flexible push-pull cables from a steering wheel control a power steering motor and a track bar which interconnects both front wheels.

U.S. Pat. No. 2,757,014 to Schmitz dated Jul. 31, 1956 discloses a steering system for a tractor having pairs of control cylinders and operating cylinders for providing steering motion to the respective front wheels which is independently controlled, there being no tie-rod connecting to the two front wheels. Although the independent control of the two front wheels is arranged so that there is a non-linear relationship between the steering motion of the left wheel and the right wheel, this non-linear relationship is not for the purpose of providing a desired Ackerman angle relationship in the steering mechanism, but, rather, is to facilitate very sharp turning of the tractor vehicle about either the left rear wheel or the right rear wheel. Accordingly, the stated objective of the steering system is solely to arrive at an extreme or limit position for the wheels in which the left wheel is turned by ninety degrees and the right wheel is turned by about fifty degrees (or vice versa). No Ackerman angle is sought or achieved for modest steering movement motions and, as the description states, any normal steering movement of the wheel 24 will be transmitted to the wheels 13 and 14 equally. Other features of the Schmitz disclosure make it unsuitable for an all-terrain vehicle or road vehicle; note that the front wheels of the vehicle are not independently suspended and there is no suggestion that it could be modified for inclusion in a vehicle with independent suspension for the steerable wheels.

U.S. Pat. No. 5,931,244 to Renfroe, et al., dated Aug. 1, 1999 discloses a cable steering system which does not include the structure and function of the simple conventional steerable wheel control arm, and uses a complex actuator for each steerable wheel; the U.S. Pat. No. 5,931,244 disclosure also requires that the Ackerman angle relation for wheel angles be provided without contribution from a control arm and its associated linkage. Some general considerations regarding lever steering from the U.S. Pat. No. 5,931,244 patent are applicable here and that patent accordingly is incorporated by reference.

Additional patents to be considered include U.S. Pat. No. 5,653,304 issued to Renfroe on Aug. 5, 1997 entitled LEVER STEERING SYSTEM and U.S. Pat. No. 5,435,407 issued to Renfroe on Jul. 25, 1995 entitled HYDROSTATIC MANUAL VEHICLE STEERING SYSTEM.

Each of these patents is hereby incorporated by reference.

Thus, it may be seen that these prior art patents are very limited in their teaching and utilization, and an improved flexible cable steering system is needed to overcome these limitations.

SUMMARY OF THE INVENTION

The present invention is directed to an improved steering mechanism utilizing flexible cables and lever arms in order to provide a compact and robust steering system for a vehicle. In accordance with one preferred embodiment of the present invention, a steering suspension system is provided which utilizes an operator input mechanism located within a land vehicle structure supported by a wheel. A suspension system connects the wheel to the land vehicle structure and a wheel steering mechanism is used to connect the wheel to the suspension system. A flexible push/pull cable is then attached from the operator input mechanism across the suspension system to the wheel steering mechanism. This minimizes the complexity in number of parts for the steering system while providing a flexible connection to the wheel steering mechanism allowing free suspension movement with minimal or negligible affects provided from the steering linkage.

Advantages of the present invention include the use of an Ackerman converter connected between the operator input mechanism and the push/pull cable to provide for the introduction of Ackerman angles to the varied steering for different wheels. Operator input mechanisms can vary in their configuration and they include items such as a steering wheel, joystick or lever input steering to provide for various applications. Other advantages provide for variations in the configurations of the steering mechanisms located at each wheel including a linear control for converting the movement of the push/pull cable into actual steering at the wheels. Devices used to implement linear controls may include items such as steering control arms, rack and pinion steering arrangements, or other well-known devices. A further advantage of the present invention is found in the use of a pivoting arm suspension implemented as a leading arm suspension to provide for maximum wheel travel while still maintaining a simplistic steering mechanism.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
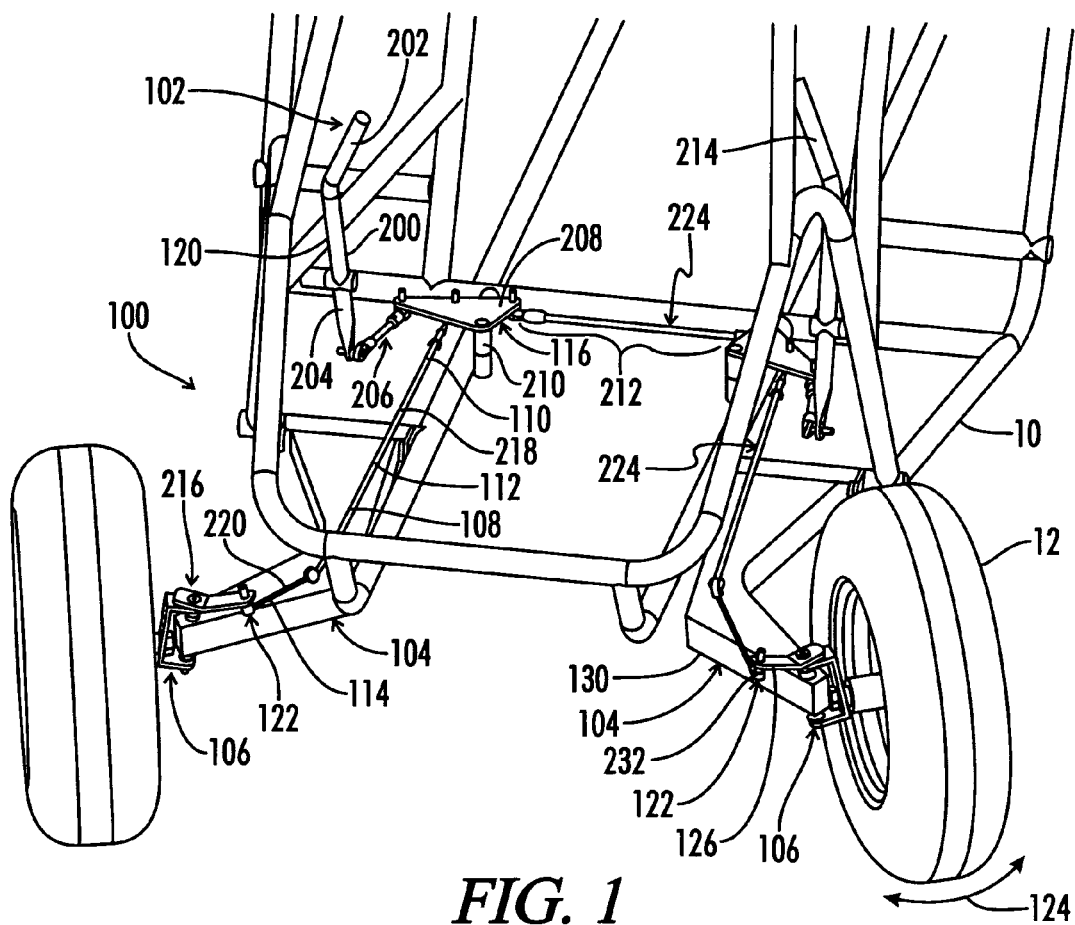
FIG. 1 is an isometric view of an exemplary embodiment of the present invention.

As shown in FIGS. 1–5 of the drawings, the present invention is directed to a steering system 100 for a land vehicle structure 10 that is supported by a ground contact element 12. The land vehicle structure 10 is shown as a tubular frame construction for an off-road type of vehicle. The ground contact element 12 is shown as a rotatable and steerable wheel 12 commonly used in vehicle movement, although tracks, sleds, and other types of contact elements are known in the prior art and may be used in the present invention.

Steering system 100 includes an operator input mechanism 102 connected to an element steering mechanism 106 across a steering suspension system 104. This connection is made by a flexible push/pull cable 108.

The operating input mechanism 102 includes an Ackerman converter 116 that is connected between the operator input mechanism 102 and the push/pull cable 108. One type of operator input mechanism 102 is a lever input steering 120 as is shown in the preferred embodiment. Alternatively, it is also envisioned that an operator input mechanism 102 could be a device such as a steering wheel, joystick, or other type of control commonly known in the prior art.

The suspension system 104 is connected into the land vehicle structure 10. As shown in the preferred embodiment, a suspension system 104 includes a pivoting leading arm 130 connecting the ground contact element 12 to the vehicle structure 10. The connection and operation of the leading arm 130 suspension is noted by the drawings of the preferred embodiment and is well is known in the prior art.

The element steering mechanism 106 is pivotally connected to the suspension system 104. The element steering mechanism 106 is designed as a linear control 122 which is adapted to linearly convert the movement of the push/pull cable 108 into a steering movement 124. The element steering mechanism 106 in the preferred embodiment is shown as a steering control arm 126, although other methods of converting motion may also be utilized such as an individual rack and pinion type of steering connection for each element 12.

The flexible push/pull cable 108 is a standard construction for a flexible control cable using a cable body 112 having an internal cable and external housing. The preferred embodiment uses a TELEFLEX (trademark) or BOWDEN CABLE (trademark), in a 60 series design for the additional stiffness. The flexible push/pull cable 108 for the vehicle design includes a first end 110 which is shown attached to the Ackerman converter 116 of the operator input mechanism 102. The flexible push/pull cable 108 also includes a cable body 112 which passes from the land vehicle structure 10 across the suspension system 104. Mounting of the cable 108 should be positioned such that the maximum motion of the suspension will not overflex the cable or dramatically change the running distance of the cable. As shown in the preferred embodiment, keeping the cable 108 close to the pivoting attachment of the suspension system 104 to the vehicle structure will generally accomplish these ideals. Finally, the flexible push/pull cable 108 includes a second end 114 which is attached to the element steering mechanism 106. Attachment of the cable 108 to the vehicle structure 10 and the suspension system 104 may be done per the cable manufacturer's recommendations. In the preferred embodiment, u-bolts are used to bolt down the outer housing of the cable 108 to the vehicle structure 10 and the suspension system 104.

Figure 2:
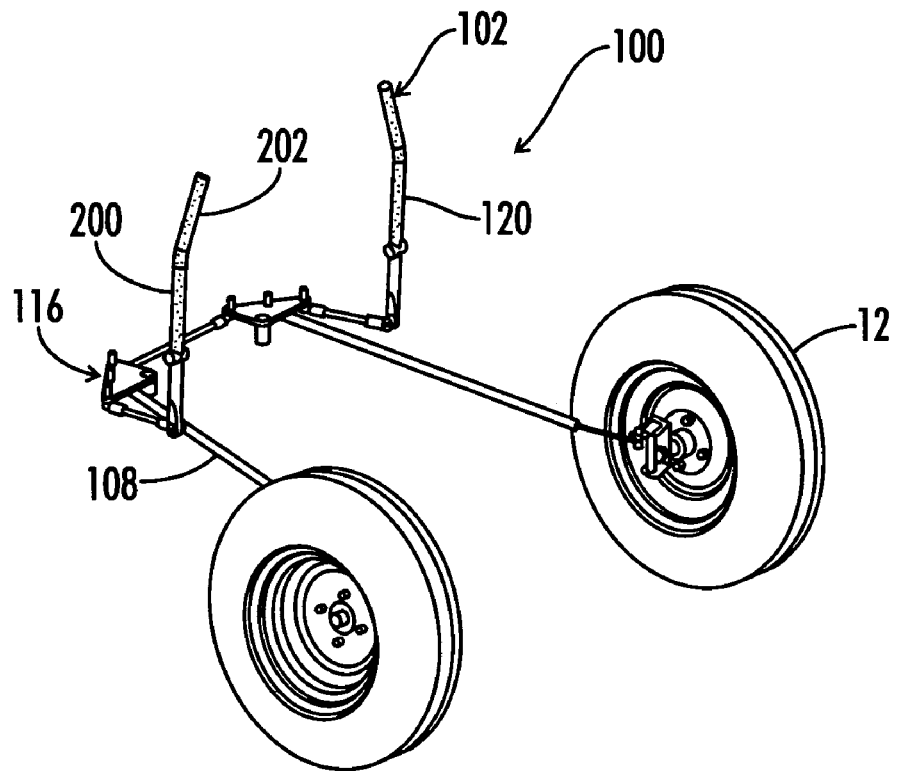
FIG. 2 is a side isometric view of the steering system of the present invention.
Figure 3:
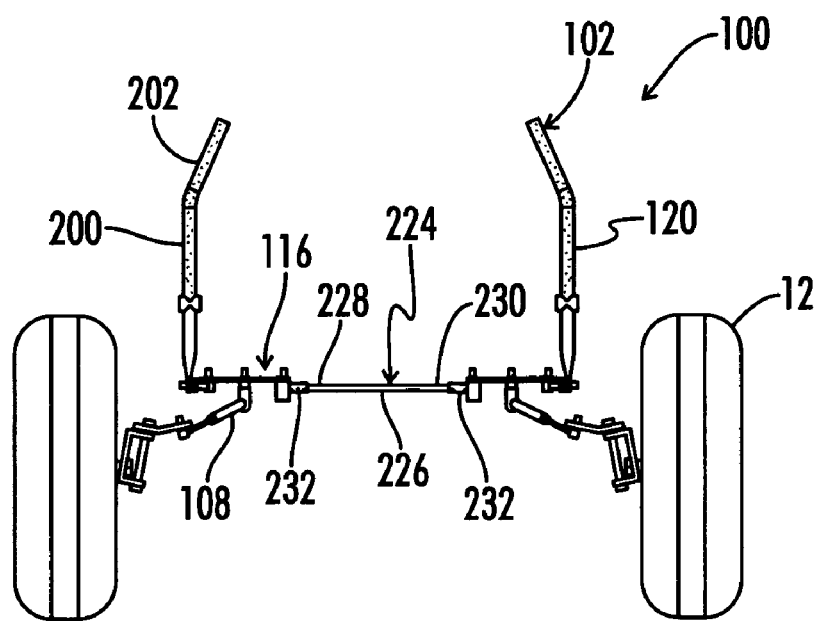
FIG. 3 is a front view of the steering system of the present invention.
Figure 4:
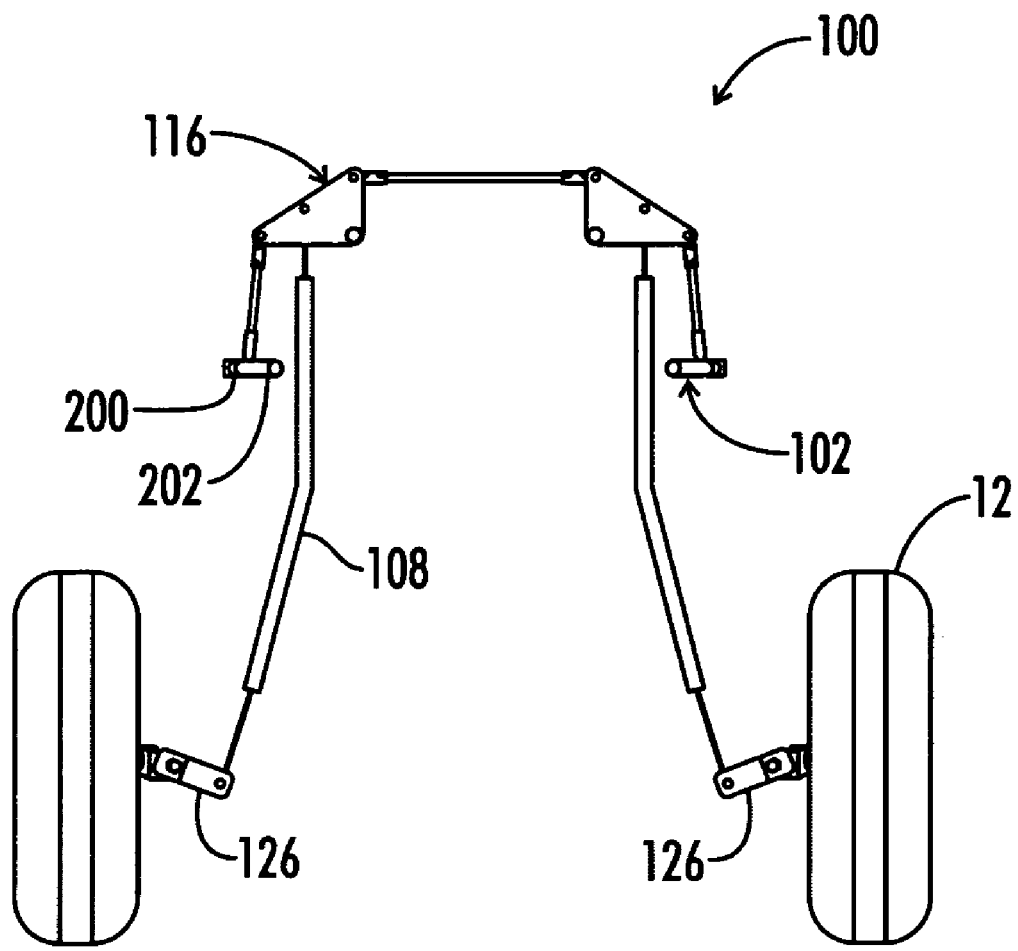
FIG. 4 is a top view of the steering system of the present invention.

Further detail is described as shown in FIGS. 2–4 of the present invention. For the land vehicle structure 10, the operator input mechanism 102 uses a lever input steering 120 having a pivoting lever arm 200 which includes an angle portion 202 having an ergonomic design to fit within a human hand and also fit the relationship to the human arm appendage and move in relation to the normal arcing movement of the human arm. An extension 204 is provided for connection into an initial transfer rod 206. The initial transfer rod 206 shifts the movement of the input lever arm 200 to the Ackerman angle converter 116. The Ackerman angle converter 116 is provided as a triangular plate 208 of steel pivoting on a main pivot mount 210. The flexible push/pull cable 108 is connected into the Ackerman converter 116 at an appropriate angle to provide leverage for the operator's input while also providing the appropriate angle conversion for the different directions of the vehicle turning. The Ackerman converter 116 finally includes a cross-connection 212 to connect to the opposite side of the steering system 100. This makes the opposite side of the steering system 100 a reverse lever arm 214 which operates in reverse of the initial lever arm 200. In this manner, a forward movement of the first lever arm 200 would also be coordinated with a reversed movement of the second lever arm 214 for steering the vehicle. The flexible push/pull cable 108 is connected into the steering arm 126 at the wheel 12 mounting 216 to the leading arm 130 of the suspension system 104. The element steering mechanism 106 is shown as a steering arm 126 that is connected across the pivoting wheel 12 connection 216 to provide directional control for the wheel 12. The steering arm 126 is a linear control 122 so that all adjustments to the steering angle may be made at the Ackerman converter 116. The body 112 of the cable 108 includes an exterior jacket 218 that is connected to the vehicle frame at the first end 110 and connected to the suspension system 104 at the second end 114 of the leading arm 130. The internal rod 220 of the push/pull cable 108 is connected to the Ackerman converter 116 plate and the steering arm 126 at the wheel 12 connection.

Figure 5:
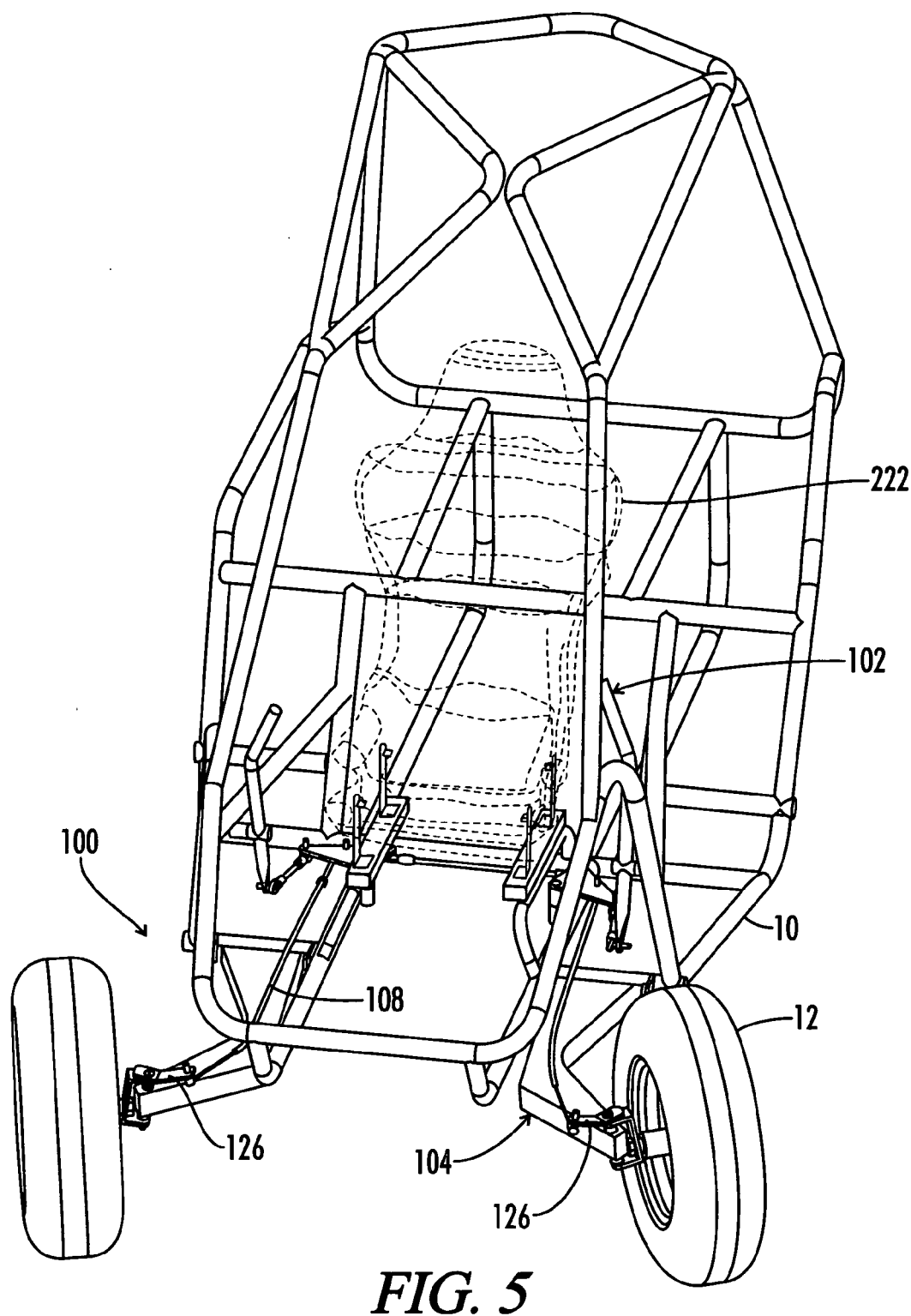
FIG. 5 is an isometric front view of the steering system showing its location under the operator seat in the vehicle frame.

As shown in FIG. 5 of the drawings, one of the advantages of the current embodiment allows for placement of the steering mechanism 100 underneath the seat 222 of the operator. This provides a compact steering arrangement which frees up space in the front of the vehicle. This allows for the size of the front of the vehicle to be reduced such that the wheels 12 may now be the first contacting element for any obstacle which the vehicle approaches. This is a key design feature when considering off-road applications where it is desirable for the vehicle to travel over anything that which it encounters. Additionally, this arrangement of the Ackerman angle converters 116 having a pivoting location inside the width of the positioning of the lever arms 200, 214 provides for increased protection for the steering mechanism 100 in the event of a side impact. This allows for the vehicle to absorb more damage before the steering system 100 may be affected by the inflicted damage. This provides a key advantage in heavy-duty off-road applications where side-swiping obstacles or other impacts may have adverse affects on other vehicle steering designs. Finally, this system provides a compact planar construction for the lever arm steering system 100 which does not require the crossing of connecting elements 224 as was known in the prior art. This provides for a simplistic design which is easier to repair and which utilizes shorter elements 224 for connections to provide a more efficient and cost effective solution in addition to reducing the problems associated with bottom impacts on the vehicle 10 which may have resulted in misalignment of the prior art systems. This again provides for additional ruggedness for the vehicle 10 in the event of impacts and reduces the possibility of affecting the steering system 100 when damage to the vehicle occurs.

An additional item to be noted is that the flexible nature of the cable 108 allows for the steering system 100 to operate while not having any negative or adverse effects on the movement of the leading arm 130 of the suspension system 104 of the vehicle.

Each one of the connecting arms 224 are made out of a rod 226 including first 228 and second threaded ends 230 connected into rod-end bearings 232 which provide for the various adaptations for changes in angles due to the pivoting movement of the lever arm 200 and the pivoting movement of the Ackerman converter 116. Additionally, rod end bearing types connections are utilized to connect the flexible push/pull cable 108 both the Ackerman converter 116 and the steering arm 126 as well as the connection of the left Ackerman converter 116 to the right Ackerman converter 116.

Using this described structure, the present invention discloses a method for steering a land vehicle which includes the steps of providing a ground contact element and directing the land vehicle in a direction. The ground contact element is connected to at least one suspension system which supports the vehicle structure. The method includes receiving a steering input force and converting the steering input forced into a first directional force. This conversion of the steering input force to a first directional force may be done by adjusting the first directional force to correspond to the appropriate Ackerman angle for steering multiple wheels. The method then continues by transferring the first directional force through a first push/pull cable to the at least one ground contact element in order to control the direction of the vehicle.

Reference numbers used to describe elements in the specification as shown in the drawings are provided as follows:
a land vehicle structure 10
a ground contact element 12
a steering system 100
an operator input mechanism 102
a steering suspension system 104
an element steering mechanism 106
a flexible push/pull cable 108.

a first end 110
a cable body 112
a second end 114
an Ackerman converter 116
a lever input steering 120
a linear control 122
a steering movement 124
a steering control arm 126
a pivoting leading arm 130
a pivoting lever arm 200
an angle portion 202
an extension 204
an initial transfer rod 206
a triangular plate 208
a main pivot mount 210
a cross-connection 212
a reverse lever arm 214
pivoting wheel mounting connection 216
an exterior jacket 218
the internal rod 220
seat 222
connecting arms 224
a connecting rod 226
first threaded end 228
second threaded end 230
rod-end bearings 232

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. A steering suspension system for a land vehicle structure supported by a ground contact element, the steering suspension system comprising:

an operator input mechanism;

a suspension system connected to the land vehicle structure;

an element steering mechanism connected to the suspension system; and a flexible push pull cable having a first end attached to the operator input mechanism, a body passing from the land vehicle structure across the suspension system, and a second end attached to the element steering mechanism.

2. The apparatus of claim 1, the operator input mechanism comprising:

an Ackerman converter connected to the push pull cable.

3. The apparatus of claim 1, the operator input mechanism comprising:

an input mechanism including an ergonomic design for control by a human appendage.

4. The apparatus of claim 1, the operator input mechanism comprising:

lever input steering.

5. The apparatus of claim 1, the steering mechanism comprising:

a linear control adapted to linearly convert the movement of the push pull cable into a steering movement.

6. The apparatus of claim 1, the steering mechanism comprising:

a steering control arm.

7. The apparatus of claim 6, the steering mechanism further comprising:

a rod end bearing attached to the flexible push pull cable.

8. The apparatus of claim 1, the suspension system comprising:

a pivoting arm connected to the vehicle.

9. The apparatus of claim 1, the suspension system comprising:

a leading arm suspension.

* * * * *